(12) United States Patent
Songer et al.

(10) Patent No.: US 7,786,935 B2
(45) Date of Patent: Aug. 31, 2010

(54) METHOD AND SYSTEM FOR INFERRING A LOCATION OF A MOBILE COMPUTING DEVICE

(75) Inventors: Christopher M. Songer, Louisville, KY (US); Patrick C. Lankswert, Louisville, KY (US)

(73) Assignee: ConnectSoft, Inc., Louisville, KY (US)

( * ) Notice: Subject to any disclaimer, the term of this patent is extended or adjusted under 35 U.S.C. 154(b) by 271 days.

(21) Appl. No.: 11/969,274

(22) Filed: Jan. 4, 2008

(65) Prior Publication Data

US 2008/0165060 A1   Jul. 10, 2008

Related U.S. Application Data

(60) Provisional application No. 60/883,796, filed on Jan. 7, 2007.

(51) Int. Cl.
G01S 3/02 (2006.01)
(52) U.S. Cl. .................................................. 342/451
(58) Field of Classification Search .................. 342/451
See application file for complete search history.

(56) References Cited

U.S. PATENT DOCUMENTS

| | | | |
|---|---|---|---|
| 7,120,129 B2 | 10/2006 | Ayyagari et al. | |
| 2003/0216144 A1 | 11/2003 | Roese et al. | |
| 2005/0258957 A1 | 11/2005 | Krumm et al. | |
| 2005/0261004 A1 | 11/2005 | Dietrich et al. | |
| 2006/0161435 A1 | 7/2006 | Atef et al. | |
| 2007/0052534 A1* | 3/2007 | Bird et al. | 340/539.13 |
| 2008/0112372 A1* | 5/2008 | Thomson et al. | 370/338 |

OTHER PUBLICATIONS

ISA/US, International Search Report and Written Opinion for PCT/US08/50218, mailed May 16, 2008.

* cited by examiner

*Primary Examiner*—Thomas H Tarcza
*Assistant Examiner*—Harry Liu
(74) *Attorney, Agent, or Firm*—Stites & Harbison, PLLC; David W. Nagle, Jr.; Stephen J. Weyer

(57) ABSTRACT

A computer-based method for inferring a location of a mobile computing device comprises the steps of using the mobile computing device to receive data about one or more devices present in a first location at a first time, including those devices available for connection; assigning an identification code to each device present in the first location; storing said data and identification code for each device present in the first location in a database; receiving new data about each device present in a location at a subsequent time, including those devices available for connection to the mobile computing device; and inferring that the mobile computing device is at the first location by comparing the new data to the stored data and identification codes.

13 Claims, 4 Drawing Sheets

METHOD AND SYSTEM FOR INFERRING A LOCATION OF A MOBILE COMPUTING DEVICE

CROSS-REFERENCE TO RELATED APPLICATIONS

The present application claims priority to U.S. Provisional Patent Application Ser. No. 60/883,796 filed on Jan. 7, 2007, the entire disclosure of which is incorporated herein by reference.

BACKGROUND OF THE INVENTION

The present invention is a computer-based method and system for inferring a location of a mobile computing device based on wireless and/or wired devices available for connection to the mobile computing device.

Computing devices are often connected to each other via wireless and wired networks. For example, mobile computing devices, such as laptop computers, often look for and connect to wireless networks as they are transported from one location to another. To enable such connections, a variety of standards have been developed to govern how communications between the computing devices take place, including, for example, 802.11, Ultra Wideband (UWB) standards, and Bluetooth®. (Bluetooth® is a registered trademark of Bluetooth Sig, Inc. of Bellevue, Wash.) Each standard ultimately defines a way for two computing devices to exchange information wirelessly using a transmitter and a receiver (i.e., a radio) on each device, but the standards vary with respect to the technical characteristics of the communications (e.g., the frequency band, power, and modulation techniques). Each standard also guarantees that each device has an identifier that is unique for the medium through which it is communicating.

Since mobile computing devices operate in various locations, "knowing" the location of the mobile computing device at any given time may enable many useful applications and features, but pinpointing the location at a given time can prove difficult. With respect to "location," it is not necessarily important where the mobile computing device is on the Earth, but rather where it is located relative to other devices and networks with which it may interact or communicate. For example, it not necessary for the mobile computing device to know where a particular office is on the Earth, but it is useful for it to know that it is near a certain printer or file server within that office.

SUMMARY OF THE INVENTION

The present invention is a computer-based method and system for inferring a location of a mobile computing device based on wireless and/or wired devices available for connection to the mobile computing device.

A exemplary method for inferring a location of a mobile computing device in accordance with the present invention commences with the mobile computing device receiving data from one or more wireless devices present and/or available for connection in a given physical location at a given time, $t_1$. Furthermore, the mobile computing device may also receive data from wired devices that are connected to the mobile computing device in the given physical location. The next step is to assign an identification code to each device present in the physical location to uniquely identify each device. Then, the data and identification code for each device present in the given physical location is stored in the database, along with a time stamp. As data is collected and stored, frequented locations may be identified and defined based on collected data. Such "defined locations" are then stored in the database and associated with each of the identification codes of the devices present in that defined location.

At some subsequent time, $t_2$, the mobile computing device receives data about each device present, including those devices available for connection to the mobile computing device. The new data is analyzed and compared to the defined locations stored in the database, such that a location of the mobile computing device can be inferred.

To carry out the exemplary method described above, a mobile computing device, such as a laptop computer, hosts a digital computer program that includes appropriate modules for executing the requisite instructions for performing the operational steps of the method: (a) a radio management module for receiving data from devices present and/or available for connection; (b) an identification code generation module for assigning an identification code to each device; (c) a database interface module for storing the data and identification code for each device in the database; (d) a location definition module for identifying and defining frequented locations based on collected data; and (e) an analysis module for inferring that the mobile computing device is at a particular location based on comparing data received from devices present and/or available for connection to the stored data and identification codes in the database.

DETAILED DESCRIPTION OF THE INVENTION

The present invention is a computer-based method and system for inferring a location of a mobile computing device based on wireless and/or wired devices available for connection to the mobile computing device.

Figure 1:
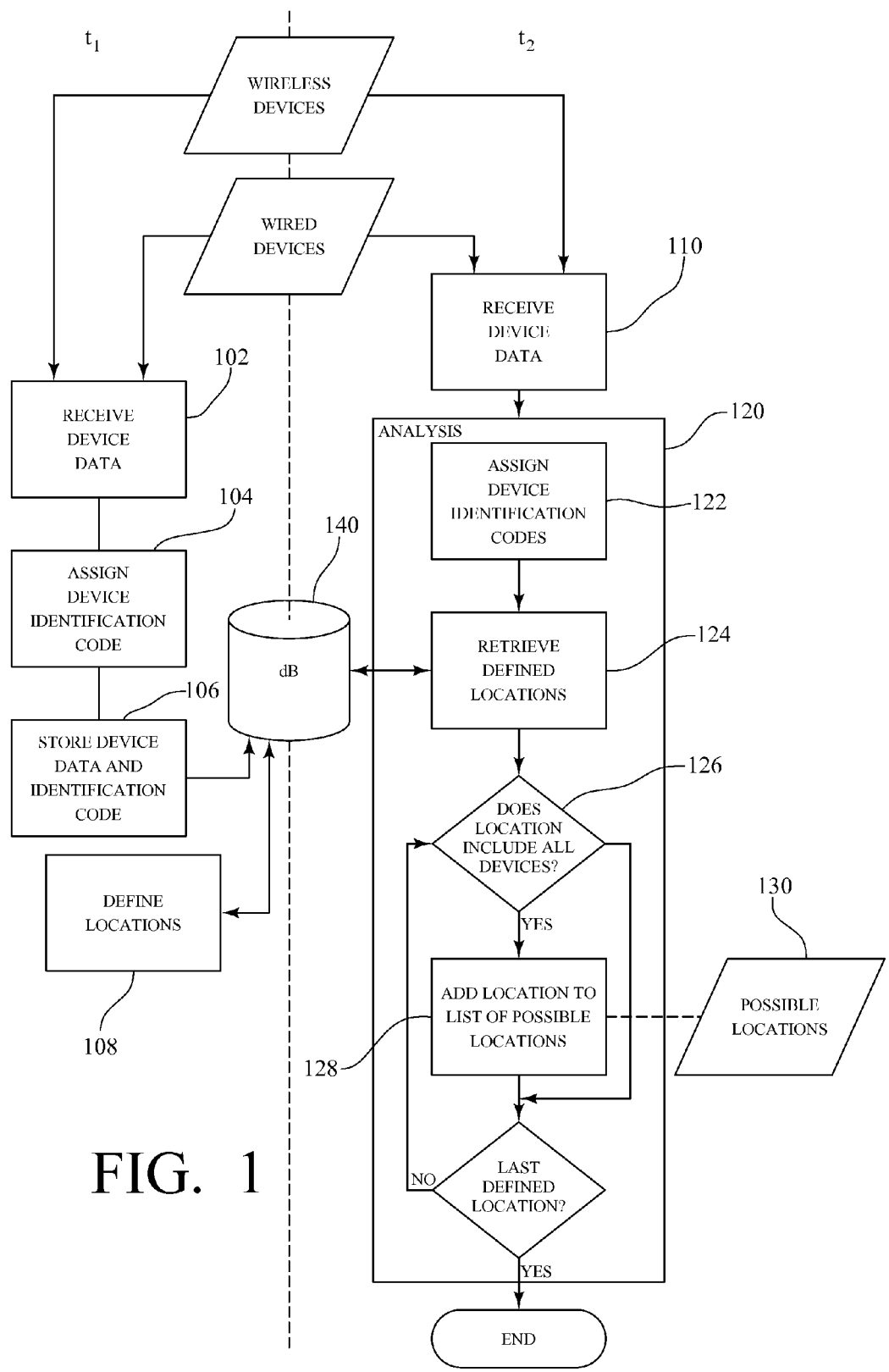
FIG. 1 is a flow chart illustrating an exemplary method for inferring a location of a mobile computing device in accordance with the present invention.

FIG. 1 is a flow chart illustrating an exemplary method for inferring a location of a mobile computing device in accordance with the present invention. As will become clear in the description that follows, the operational steps of this method are preferably achieved through the use of a digital computer program, i.e., computer-readable instructions stored and executed by a computer. Accordingly, the mobile computing device hosts a digital computer program that includes appropriate modules for executing the requisite instructions. Such instructions can be coded into a computer-readable form using standard programming techniques and languages, and with benefit of the following description, such programming is readily accomplished by one of ordinary skill in the art.

Referring still to FIG. 1, the method commences with the mobile computing device receiving data from one or more wireless devices present and/or available for connection in a given physical location at a given time, $t_1$, as indicated by block 102. For wireless devices, such data may include identifying information, such as: (a) the type of radio (Bluetooth®, 802.11, etc.); (b) the unique identifier of the radio (BD_ADDR for Bluetooth®, SSID for 802.11, etc.); and (c) signal strength information. With respect to such data, it should be recognized that there is a distinction between wireless devices present in a location and wireless devices that are available for connection in a location. For example, the mobile computing device may receive data from and identify an access point to a secure network in a given physical location, but without an appropriate security key or password, the mobile computing device can not connect to that access point. For purposes of the present invention, however, it is still helpful to know that the access point is present, even if it is not available for connection because it serves to identify and distinguish the physical location of the mobile computing device.

Furthermore, the mobile computing device may also receive data from wired devices that are connected to the mobile computing device in the given physical location at a given time, as also indicated by block 102.

The next step is to assign an identification code to each device present in the physical location, as indicated by block 104. Such an identification code should uniquely identify the device. For example, one such technique for constructing a unique identification code would be to append the unique, medium-specific identifier of the radio of the device (e.g., BD_ADDR for Bluetooth®, SSID for 802.11) with a unique identifier for the type of radio. For instance the numeral "1" could be appended to the unique identifier of a Bluetooth® radio, while the numeral "2" could be appended to the unique identifier of a 802.11 radio of the same device. Such a technique would guarantee a unique identification code. If such a technique is used, it should also be recognized that a device may actually be included multiple times in the list of devices in the physical location if the device has multiple radios that are communication with the mobile computing device, as each radio may be considered a separate device for purposes of the present invention.

Then, the data and identification code for each device present in the given physical location is stored in the database 140, along with a time stamp, as indicated by block 106. This process of data collection and storage can occur on a scheduled basis or can be initiated by the user.

As data is collected and stored, frequented locations may be identified and defined based on collected data, as indicated as indicated by block 108. Such "defined locations" are then stored in the database 140 and associated with each of the identification codes of the devices present in that defined location.

For example, each identified Internet access point may be considered and defined as a location.

For another example, each device stored in the database 140 may be considered a node, such that a graph can be assembled with an edge defined between any two nodes representing devices that have been seen at the same time. The weight ascribed to each such edge is the number of minutes the devices have been seen and sampled together.

Figure 2:
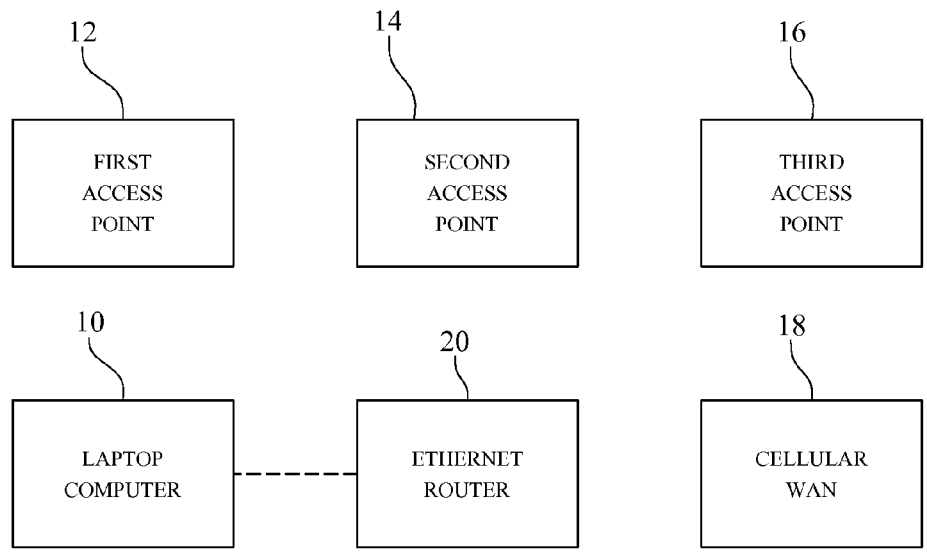
FIG. 2 is an illustration of an exemplary environment in which a mobile computing device is operating.

FIG. 2 illustrates an exemplary environment (i.e., a physical location) in which a mobile computing device, e.g., a laptop computer 10, can connect to a first access point 12, a second access point 14, a third access point 16, and a cellular WAN 18. The laptop computer 10 is also connected to an Ethernet router 20. For purposes of example, assume that the environment illustrated in FIG. 2 has been sampled at the following intervals:

1500 1/1/07: FIG. 2
1505 1/1/07: FIG. 2
1515 1/1/07: FIG. 2
1530 1/1/07: FIG. 2
1600 1/1/07: FIG. 2
1630 1/1/07: FIG. 2

In this example, sampling becomes less frequent when there has been no change in the devices seen by the laptop computer.

Figure 4:
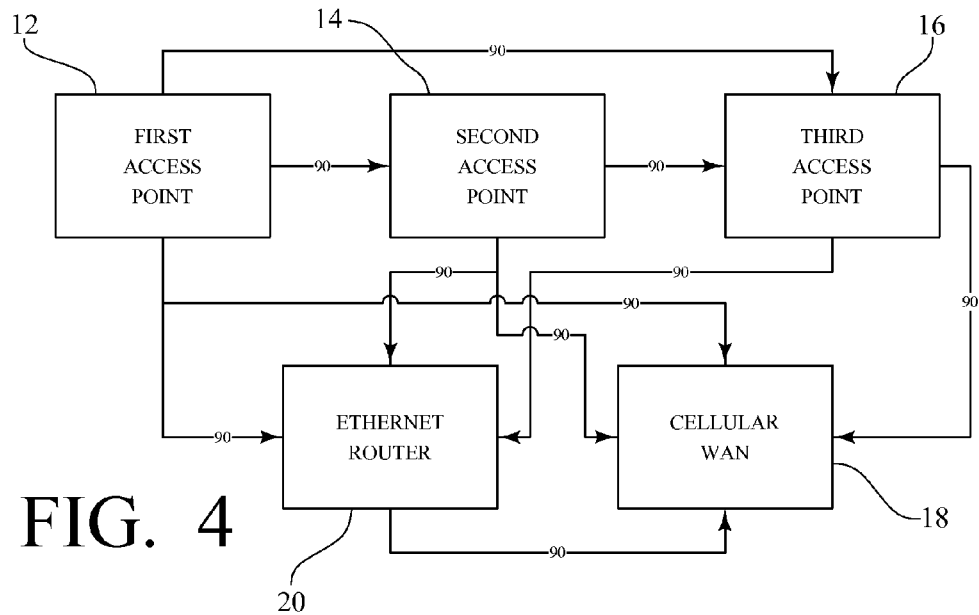
FIG. 4 is a graph assembled from data collected by the mobile computing device in the exemplary environment illustrated in FIG. 2.

FIG. 4 is a graph assembled from this data, and it should be recognized that all the edges are the same weight because all devices were sampled together for the full time—90 minutes. Because this node set has remained constant for a predetermined period of time (in this case, 90 minutes), it can be assumed that this node set represents a single physical location, and the node set can be stored as a defined location in the database 140. In this regard, the defined location would be associated with each of the identification codes of the devices present in the location.

Figure 3:
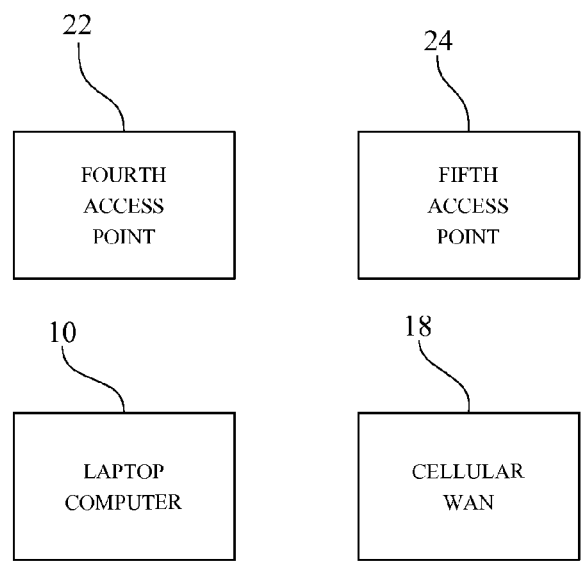
FIG. 3 is an illustration of a second exemplary environment in which a mobile computing device is operating.

The laptop computer is then relocated to the exemplary environment (i.e., another physical location) illustrated in FIG. 3, in which the laptop computer 10 can connect to a fourth access point 22, a fifth access point 24, and the same cellular WAN 18. Assume that the environment illustrated in FIG. 3 has been sampled at the following intervals:

1700 1/1/07: FIG. 3
1705 1/1/07: FIG. 3
1715 1/1/07: FIG. 3
1730 1/1/07: FIG. 3
1800 1/1/07: FIG. 3
1830 1/1/07: FIG. 3

Figure 5:
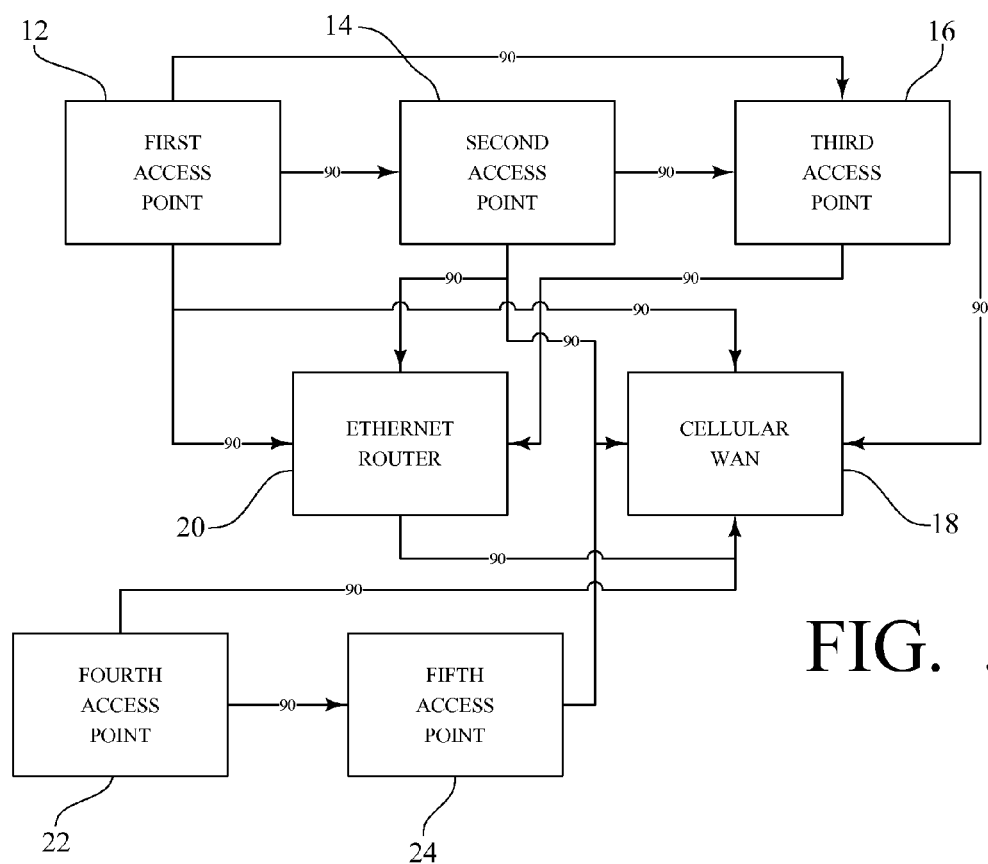
FIG. 5 is a graph assembled from data collected by the mobile computing device in the exemplary environment illustrated in FIG. 2 and the exemplary environment illustrated in FIG. 3.

FIG. 5 is a second graph that shows the prior sampling from FIG. 4, along with the new data once the laptop computer 10 was relocated to the exemplary environment (or physical location) illustrated in FIG. 3. Without the Cellular WAN 18, the graph would comprise two separate "pieces" in that no edges connect the node set comprised of the first access point 12, the second access point 14, the third access point 16, and the Ethernet router 20 to the node set comprised of the fourth access point 22 and the fifth access point 24. Accordingly, in this example, the presence of the cellular WAN 18 in all locations indicates a top level location. The node set comprised of the first access point 12, the second access point 14, the third access point 16, and the Ethernet router 20 (FIG. 2) represents a sublocation with respect to the top level location, just as the node set comprised of the fourth access point 22 and the fifth access point 24 (FIG. 3) represents another sublocation. These defined locations (or sublocations) can also be stored in the database 140.

As a further refinement, graph partitioning algorithms may be used to divide a series of nodes (each representing a device present in a particular environment) and edges (defined between any two nodes representing devices that have been seen at the same time) into partitions. A number of such graph partitioning algorithms (also referred to as minimum cut or min-cut algorithms) have been developed and can be used to find a nontrivial partition of a series of nodes by minimizing the "cut weight," which is the sum of the weights of the edges connecting respective partitions. See, e.g., Stoer, Mechthild; Wagner, Frank, "A Simple Min-Cut Algorithm," Journal of the ACM, Vol. 44, No. 4, pp. 585-591 (July 1997). Once such partitions have been identified, each partition can be stored as a defined location (or sublocation) in the database 140.

Furthermore, identifying and defining locations can also take into account other factors, for example, the spatial relationships between the mobile computing device and the wireless devices present and/or available for connection, which can be determined from the relative signal strengths.

Finally, it should be recognized that a user interface (not shown) could be provided to allow the user to define or modify locations stored in the database 140 and associated with each of the identification codes of the devices present in the respective locations.

Returning now to FIG. 1, at some subsequent time, $t_2$, the mobile computing device receives data about each device present, including those devices available for connection to the mobile computing device, as indicated by block 110. The new data is analyzed and compared to the defined locations stored in the database 140, such that a location of the mobile computing device can be inferred, as indicated by block 120.

For instance, in the exemplary method illustrated in FIG. 1, the analysis actually involves a number of discrete substeps. First, an identification code is assigned to each device present in the physical location at $t_2$ in order to uniquely identify each device, as indicated by block 122. This is done in the same manner as the assignment of identification codes described above at $t_1$ with reference to block 104. Then, a list of all defined locations is retrieved from the database 140, as indicated by block 124. Then, there is a comparison of the devices associated with each defined location from the database 140 as compared to the devices identified as present in the physical location at $t_2$. In other words, each defined location is analyzed to determine whether it includes all the devices that have been identified in the physical location at $t_2$, as indicated by decision 126. If so, that defined location is added to a list (represented by output 130) of possible locations where the mobile computing device may be currently located, as indicated by block 128.

Once such a list has been generated, if there is a single entry in that list, there is a high probability that that possible location is indeed where the mobile computing device is currently located. If there are multiple entries, further statistical analysis could be employed to identify a "best match." Alternatively, the list may be displayed to a user who can then select the "best match" from the list of possible locations. In any event, as a result of the analysis at block 120, the location of the mobile computing device can be inferred. That location is then communicated to the user in some fashion, or certain settings or preferences in identified software applications may be automatically established or changed based on the location.

Finally, it should be recognized that a user interface (not shown) could be provided to allow the user to define or modify locations stored in the database 140 and associated with each of the identification codes of the devices present in the respective locations.

Figure 6:
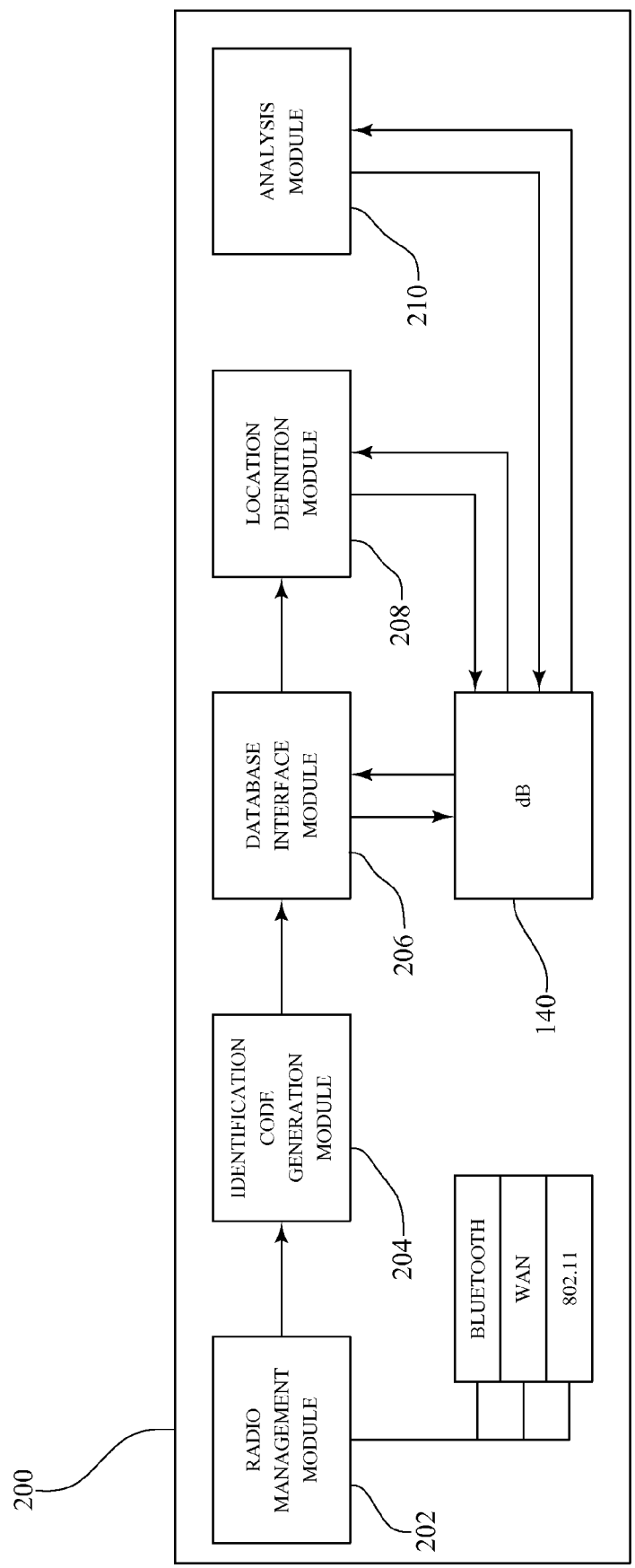
FIG. 6 is a schematic representation of a mobile computing device, including the appropriate modules for executing the requisite instructions for performing the operational steps of the method of the present invention.

FIG. 6 illustrates the core components of an exemplary system for carrying out the method described above. The mobile computing device 200, such as a laptop computer, has a Bluetooth® radio, a WAN radio, and an 802.11 radio. The mobile computing device 200 hosts a digital computer program that includes appropriate modules for executing the requisite instructions for performing the operational steps of the method: (a) a radio management module 202 for receiving data from devices present and/or available for connection; (b) an identification code generation module 204 for assigning an identification code to each device; (c) a database interface module 206 for storing the data and identification code for each device in the database 140; (d) a location definition module 208 for identifying and defining frequented locations based on collected data; and (e) an analysis module 210 for inferring that the mobile computing device is at a particular location based on comparing data received from devices present and/or available for connection to the stored data and identification codes in the database 140.

One of ordinary skill in the art will also recognize that additional embodiments are also possible without departing from the teachings of the present invention or the scope of the claims which follow. This detailed description, and particularly the specific details of the exemplary implementation disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A computer-based method inferring a location of a mobile computing device, comprising the steps of:
   using the mobile computing device to receive data about one or more devices present in a first location at a first time;
   assigning an identification code to each device present in the first location;
   storing said data and the identification code for each device present in the first location in a database;
   receiving new data about each device present in a location at a subsequent time; and
   inferring that the mobile computing device is at the first location by comparing the new data to the stored data and identification codes.

2. The computer-based method as recited in claim 1, in which receiving data about each device present in the first location includes data from wireless devices and wired devices.

3. The computer-based method of claim 1, and further comprising defining a first physical location based on devices in the first location, and wherein inferring that the mobile computing device is at the first location comprises comparing the new data to the stored data and the identification codes, thereby inferring that the mobile device is at the first physical location if the new data for devices at the location at the subsequent time indicates that those devices are the same as the devices at the first physical location.

4. The computer-based method of claim 1, wherein the step of assigning an identification code comprises assigning a unique identification code to each device present in the first location upon receipt of the data.

5. A computer-based method inferring a location of a mobile computing device, comprising the steps of:
   using the mobile computing device to periodically receive data from one or more wireless devices in radio communication with said mobile computing device;
   assigning an identification code to uniquely identify a radio of each wireless device in radio communication with said mobile computing device;
   storing each identification code in a database;
   periodically analyzing the stored identification codes to identify one or more defined locations, each such defined location being associated with one or more stored identification codes;
   receiving data from one or more wireless devices in radio communication with said mobile computing device in a given location at a subsequent time;
   assigning an identification code to uniquely identify a radio of each wireless device in the given location at the subsequent time; and comparing the identification codes in the given location at the subsequent time with those identification codes associated with each defined location in the database to determine if said mobile computing device is currently at one of the defined locations.

6. The computer-based method as recited in claim 5, in which received data from each wireless device includes: an identification of a type of radio through which the wireless device is communicating with said mobile computing device; and a unique identifier of each radio through which the wireless device is communicating with said mobile computing device.

7. The computer-based method as recited in claim 6, in which received data from each wireless device further includes signal strength information.

8. The computer-based method as recited in claim 6, in which received data is stored with the identification code for each wireless device in the database.

9. The computer-based method as recited in claim 6, in which each identification code is constructed by appending the unique identifier of the radio of the wireless device with a unique identifier for the type of radio through which the wireless device is communicating with said mobile computing device.

10. The computer-based method as recited in claim 6, in which the step of periodically analyzing the stored identification codes to identify one or more defined locations is based on a graphical analysis in which each identification code stored in the database is considered a node, with an edge then being defined between any two nodes representing radios of devices that have been seen at the same time.

11. The computer-based method of claim 5, wherein assigning an identification code comprises assigning an identification code to uniquely identify each wireless device in radio communication with said mobile computing device after said mobile computing device receives data from each respective wireless device in radio communication with said mobile computing device.

12. A computer-based system inferring a location of a mobile computing device, comprising:
  a radio management module resident on a computer-readable medium of the mobile computing device for receiving data from one or more devices present in a given location;
  an identification code generation module resident on the computer-readable medium of the mobile computing device for assigning an identification code to each such device,
  a database interface module resident on the computer-readable medium of the mobile computing device for storing the identification code for each such device in a database;
  a location definition module resident on the computer-readable medium of the mobile computing device for identifying and defining frequented locations, which are also stored in the database; and
  an analysis module resident on the computer-readable medium of the mobile computing device for inferring that the mobile computing device is at a particular location based on comparing data received through said radio management module to frequented locations stored in the database.

13. The computer-based system of claim 12, wherein the identification code generation module assigns an unique identification code to each such device upon the radio management control module receiving data from each device present in the given location.

* * * * *